(12) United States Patent
Mccarra

(10) Patent No.: US 11,624,445 B2
(45) Date of Patent: Apr. 11, 2023

(54) SYSTEMS AND METHODS FOR GATE VALVES

(71) Applicant: SCV Valve, LLC, Santa Fe, TX (US)

(72) Inventor: Sidney Mccarra, League City, TX (US)

(73) Assignee: SCV VALVE, LLC, Santa Fe, TX (US)

( * ) Notice: Subject to any disclaimer, the term of this patent is extended or adjusted under 35 U.S.C. 154(b) by 3 days.

(21) Appl. No.: 17/077,438

(22) Filed: Oct. 22, 2020

(65) Prior Publication Data

US 2021/0123535 A1    Apr. 29, 2021

Related U.S. Application Data

(60) Provisional application No. 62/925,626, filed on Oct. 24, 2019.

(51) Int. Cl.
| | |
|---|---|
| *F16K 3/36* | (2006.01) |
| *F16K 3/02* | (2006.01) |
| *F16K 3/18* | (2006.01) |

(52) U.S. Cl.
CPC .............. *F16K 3/36* (2013.01); *F16K 3/0227* (2013.01); *F16K 3/18* (2013.01)

(58) Field of Classification Search
CPC ............. F16K 3/36; F16K 3/0227; F16K 3/18
USPC .......................... 251/193–204, 326–329, 355
See application file for complete search history.

(56) References Cited

U.S. PATENT DOCUMENTS

| | | | | |
|---|---|---|---|---|
| 2,433,638 A | * | 12/1947 | Volpin | F16K 5/225 137/246.12 |
| 2,570,413 A | * | 10/1951 | Volpin | F16K 3/36 137/246.12 |
| 2,605,078 A | * | 7/1952 | Volpin | F16K 3/36 137/246.11 |
| 2,653,789 A | * | 9/1953 | Eichenberg | F16K 3/36 137/246.12 |
| 2,657,898 A | * | 11/1953 | Volpin | F16K 3/36 137/246.12 |
| 2,869,574 A | * | 1/1959 | Volpin | F16K 3/36 137/246.12 |
| 3,026,895 A | * | 3/1962 | Volpin | F16K 3/36 137/246.12 |
| 4,146,209 A | * | 3/1979 | Leva | F16K 3/184 251/168 |

(Continued)

*Primary Examiner* — John Bastianelli
(74) *Attorney, Agent, or Firm* — Bookoff McAndrews, PLLC

(57) ABSTRACT

A gate valve system includes a body including an upstream end, a downstream end, and a flow path extending through the upstream end and the downstream end. The gate valve system includes a gate assembly extending within the body, the gate assembly including a gate a stem secured to the gate and configured to place the expandable gate in a first position in which a flow of fluid is permitted between the upstream end and the downstream end and a second position in which the flow of fluid is prevented. The gate valve system also includes a lubrication port in an exterior of the body, the lubrication port being in fluid communication with an interior of the body and including a lubrication guiding insert configured to guide a supply of lubricating fluid to a location inside the body and between the upstream end and the downstream end.

15 Claims, 3 Drawing Sheets

(56) References Cited

U.S. PATENT DOCUMENTS 5,037,064 A * 8/1991 Pond .................... F16K 3/0227
251/195

* cited by examiner

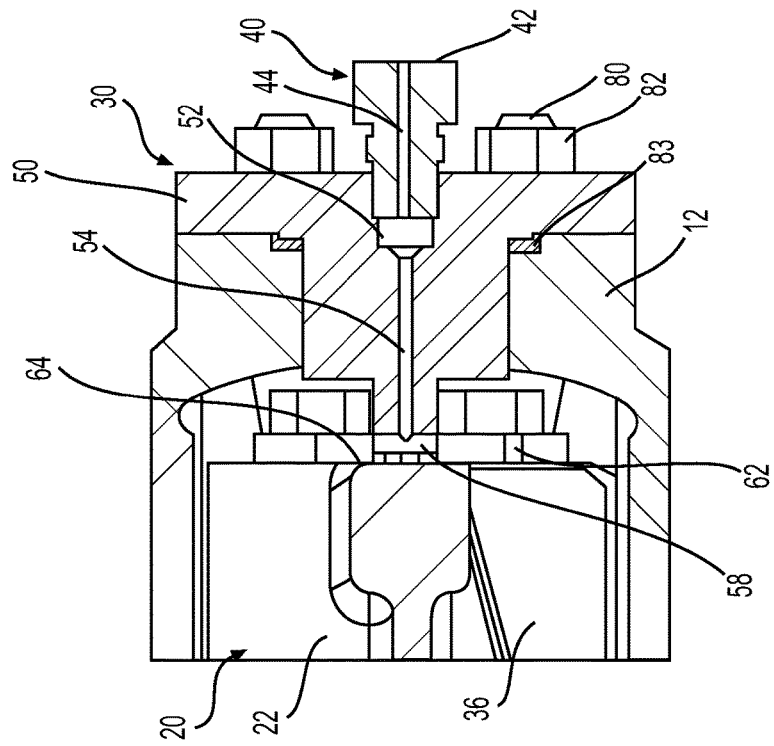
*FIG. 4*
*FIG. 5*
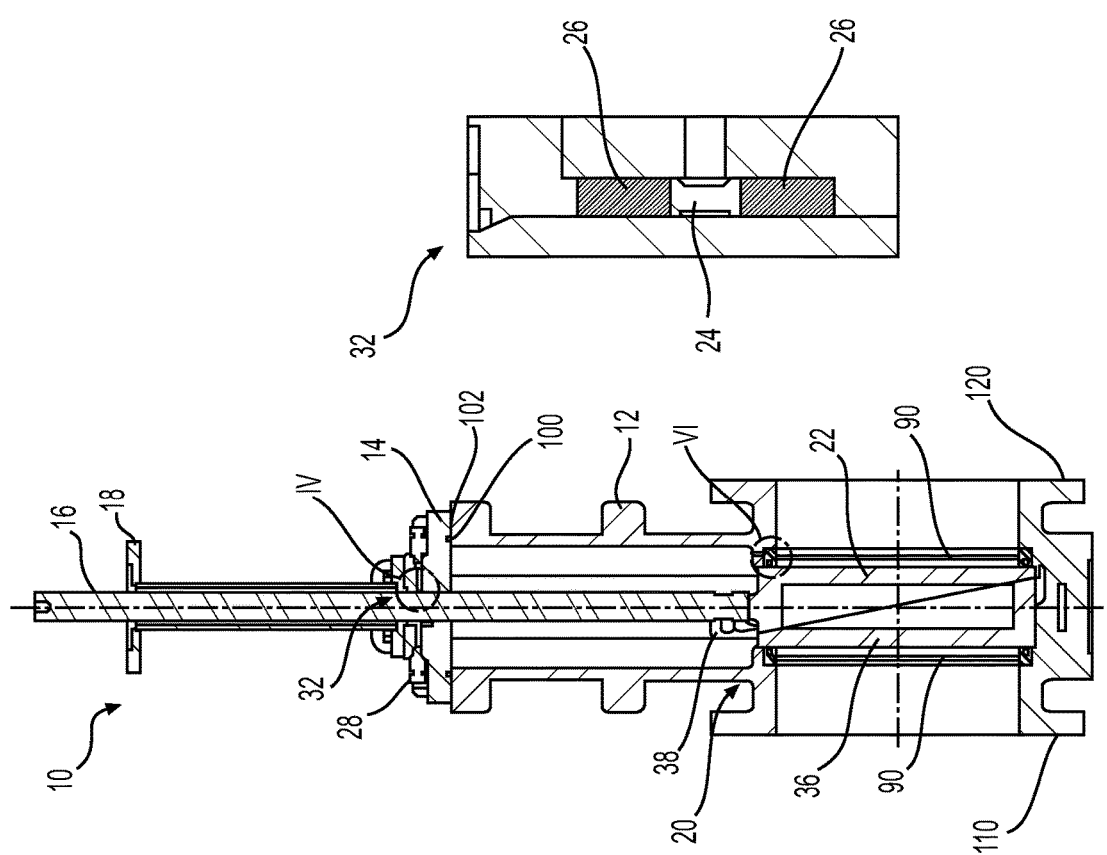
*FIG. 3*

SYSTEMS AND METHODS FOR GATE VALVES

CROSS-REFERENCE TO RELATED APPLICATION(S)

This application claims the benefits of priority to U.S. Provisional Application No. 62/925,626, filed on Oct. 24, 2019, the entirety of which is herein incorporated by reference.

TECHNICAL FIELD

Aspects of the present disclosure relate generally to valves and valve systems useful, for example, in oil and gas applications. In particular, aspects of the present disclosure relate to methods and systems for expanding gate valve assemblies.

BACKGROUND

Valve devices, such as gate valve assemblies, are useful for fluid handling in, for example, the oil and gas, power, chemical, water works, waste water, and manufacturing industries. Gate valve systems in particular are useful to selectively permit or block the flow of large volumes of fluid. Gate valves are robust systems that operate in harsh environments and under severe conditions. In order to perform in these environments, valve systems include components that are resistant to debris, corrosion, and wear. In order to ensure continued operation of the valve, components are regularly inspected and maintained. However, even when inspections and maintenance are performed regularly, wear occurs on moving parts that are inaccessible while the valve is in service. In addition to wear, corrosion can occur within the valve, often affecting locations that are inaccessible or difficult to access without removing the valve device from adjacent fluid handling components. Removing the valve from a line is a time consuming process.

Since it is desirable to infrequently remove the valve for maintenance or repair, components that are difficult to access may experience wear and corrosion at an increased rate compared to more readily-accessible components of the valve system. Wear and damage may occur even more quickly when lubrication becomes depleted. However, existing valve devices do not include adequate mechanisms for lubricating components of the valve that are difficult to access when the valve is connected to upstream and downstream components.

Additionally, under some circumstances, leaks can develop in one or more areas of the valve, such as a valve seat. Leaks, while rare, are critical conditions requiring immediate attention that disrupt operations. Traditional valve systems lack mechanisms for quickly halting a leak, potentially resulting in hazardous conditions.

SUMMARY

According to certain embodiments, systems and methods are disclosed for a gate valve for fluid handling.

In one aspect, a gate valve system may include a body having an upstream end, a downstream end, and a flow path extending through the upstream end and the downstream end. The gate valve system may include a gate assembly extending within the body, the gate assembly including a gate a stem secured to the gate and configured to place the expandable gate in a first position in which a flow of fluid is permitted between the upstream end and the downstream end and a second position in which the flow of fluid is prevented. The gate valve system may also include a lubrication port in an exterior of the body, the lubrication port being in fluid communication with an interior of the body and including a lubrication guiding insert configured to guide a supply of lubricating fluid to a location inside the body and between the upstream end and the downstream end.

In another aspect, a gate valve system may include a body having an upstream end forming an upstream opening a downstream end forming a downstream opening and an expandable gate moveable between an open position and a closed position. The gate valve system may include a seat ring positioned to contact the expandable gate when the expandable gate is in the closed position, the seat ring including a radially-extending passage and a sealant port extending within the body, the sealant port being in fluid communication with the radially-extending hole in the seat ring.

In yet another aspect, a method of assembling a gate valve system may include forming a body including an upstream end, a downstream end, and a flow path extending through the upstream end and the downstream end and placing an expandable gate valve assembly within the body, the expandable gate valve assembly including a gate within the body and a stem secured to the gate, the stem being configured to actuate the expandable gate between a first position in which a flow of fluid is permitted between the upstream end and the downstream end and a second position in which the flow of fluid is prevented. The method may also include forming a lubrication port in an exterior of the body, the lubrication port being in fluid communication with an interior of the body and including a lubrication guiding insert configured to guide a supply of fluid to a location between the upstream end and the downstream end.

In one aspect, an expanding gate valve assembly may include a body having an upstream end and a downstream end, a bonnet secured to the body, a gate assembly extending within the body and the bonnet, the gate assembly including a stem and an expandable gate, and a lubrication port formed in the body, the lubrication port providing access to the gate, wherein the lubrication port is located between the upstream end and the downstream end.

In another aspect, a method of servicing a gate valve assembly may include coupling a lubricant-introducing member having an internal fluid passage to a port of a body of the gate valve assembly, connecting an injection fitting to a recess formed in the lubricant-introducing member, and providing a supply of lubricant to a moving component of the gate valve assembly by injecting the lubricant through the injection fitting and through the lubricant-introducing member.

In another aspect, an expanding gate valve assembly may include a body having an upstream end and a downstream end, a bonnet secured to the body, and a gate assembly extending within the body and the bonnet, the gate assembly including a stem and an expandable gate. The expanding gate valve assembly may also include a seal ring provided in the body and configured to form a seal with the gate and a port formed in the seal ring configured to receive sealant, the port forming a path for sealant toward at least one of the body or the gate.

In yet another aspect, a method of servicing a gate valve assembly may include closing the gate valve assembly by causing an expanding gate to contact a seat ring and introducing a sealant into a port provided on a seat to seal a leak in the gate valve assembly, wherein the sealant is introduced by a port provided on an inner circumferential surface of the seat ring when the gate valve assembly is under pressure.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 is a cross-sectional view along line III-Ill of FIG. 1;

FIG. 4 is a detailed view of section IV of FIG. 3;

FIG. 5 is a cross-sectional view along line V-V of FIG. 1; and

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
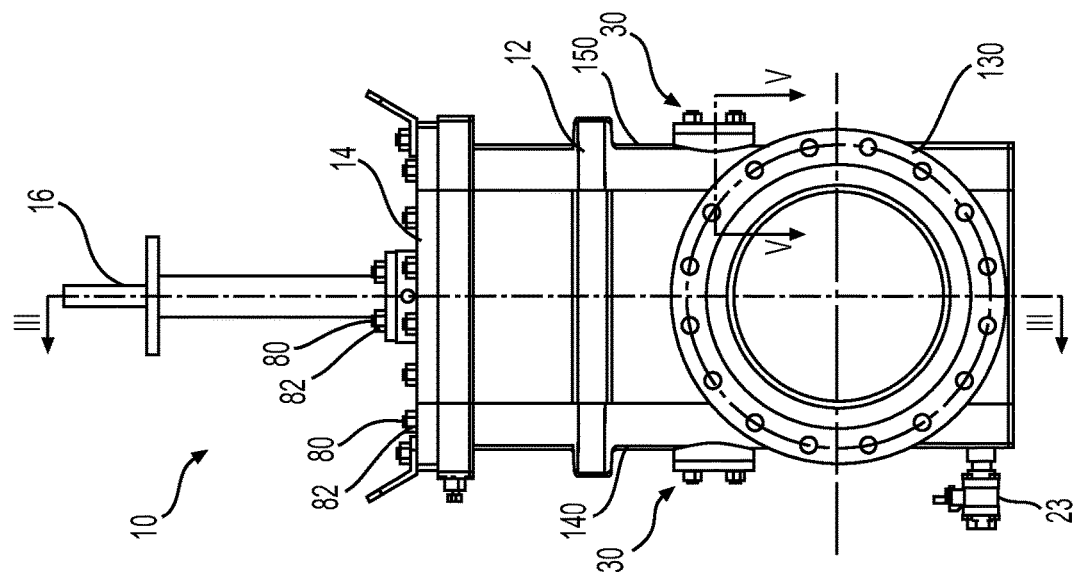
FIG. 1 is a front view of an expanding gate valve assembly according to an aspect of the present disclosure.

FIG. 1 is a front view of an expanding gate valve assembly or system 10 according to aspects of the present disclosure. Gate valve system 10 may include a body 12, a bonnet 14, a stem 16, and a gate assembly 20 (FIG. 3) secured to stem 16. Body 12 may extend from an upstream end 110 to a downstream end 120 (FIG. 2), and include an upper end to which bonnet 14 is secured. Transverse ends 140 and 150 may extend between upstream and downstream ends 110 and 120. Stem 16 may extend through bonnet 14 and the upper end of body 12. Stem 16 may be secured at a center of valve system 10, between upstream and downstream ends 110 and 120, and between transverse ends 140 and 150. Annular flanges or ports 130, formed at upstream and downstream ends 110 and 120, may be sized and shaped for connection to upstream and downstream pipeline components, and may include a series of bolt holes to allow ports 130 to facilitate leak-free connections to these components. A valve 23, such as a ball valve, may allow an operator to withdraw a sample of fluid from valve system 10 during inspection or maintenance.

Body 12 and bonnet 14 may be formed of any suitable material. For example, body 12 and bonnet 14 may be formed of corrosion-resistant materials. In particular body 12 and bonnet 14 may be formed of a metal material, such as stainless steel (e.g., 17-4 stainless steel), carbon steel, etc.

Gate valve system 10 may include one or more service or lubrication ports 30. Lubrication ports 30 may provide access to an interior of body 12 for a supply of lubricating fluid. Each lubrication port 30 may be positioned so as to protrude from body 12 at transverse end 140 or transverse end 150. Similarly, transverse end 150 may include two or more lubrication ports 30. Each lubrication port 30 may be in fluid communication with an interior of body 12. For example, lubrication port 30 may be configured to guide a lubricating fluid, such as grease, to a location between upstream end 110 and downstream end 120, as described below.

Figure 2:
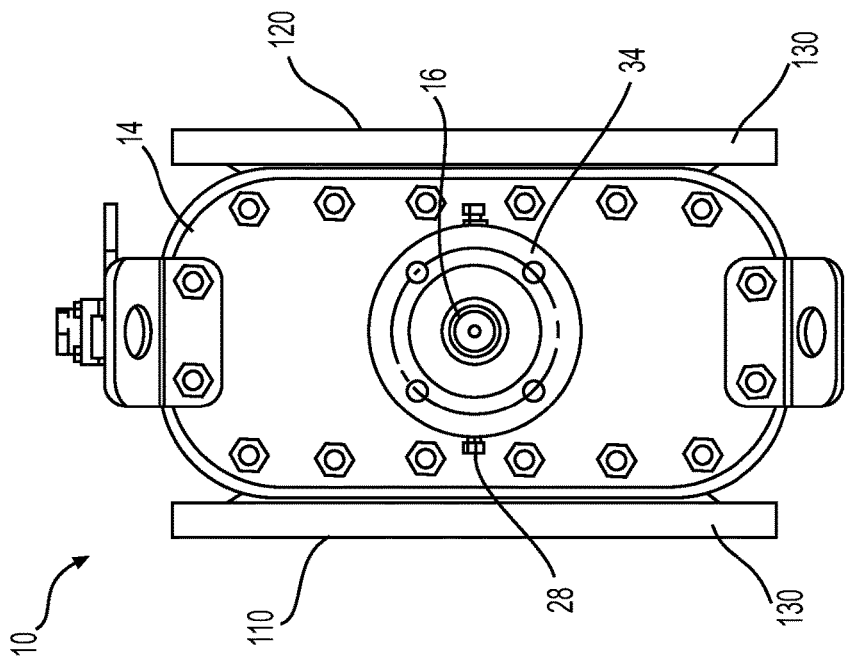
FIG. 2 is a top view of the expanding gate valve assembly of FIG. 1.

With reference to FIG. 2, bonnet 14 may be secured to body 12 such that bonnet 14 surrounds stem 16. Bonnet 14 may be secured to body 12 in any suitable manner. For example, bonnet 14 may receive a plurality of fasteners 80, such as bolts, and a respective plurality of fixing members 82, such as nuts (FIG. 1). An upper plate 34 may form a flange positioned above bonnet 14 so as to extend proximally away from body 12 toward a proximal end of stem 16. A packing injection fitting 28 may be provided on bonnet 14 to facilitate insertion of packing material for sealing stem 16. Upper surface 34 and stem 16 may be provided at a central portion of valve system 10 between upstream end 110 and downstream end 120.

FIG. 3 is a cross-sectional view along line III-Ill of FIG. 1. As shown in FIG. 3, a gate assembly 20 may be moveably secured within a hollow interior of body 12. Gate assembly 20 may include stem 16, which includes a proximal end protruding through both bonnet 14 and upper plate 34, and a distal end fixed to an expandable gate 22. The proximal end of stem 16, which corresponds to the upper end of stem 16 as shown in FIG. 3, may be operably connected to an actuator 18 to operate gate assembly 20. A packing assembly 32 may be provided within bonnet 14 adjacent to stem 16. Packing assembly 32 may be configured to seal stem 16 and secure against leakage at an upper surface of bonnet 14. Bonnet 14 make be secured to body 12 via an O-ring 100 and a gasket 102.

Actuator 18 may include a handwheel that facilitates manual actuation of gate assembly 20. For example, actuator 18 may include an internally-threaded handwheel that, when manually operated, raises and lowers gate assembly 20 to move gate assembly 20 between an open position and a closed position, respectively. In some configurations, actuator 18 may instead include a pneumatic control device configured to selectively position gate assembly 20 in the open position and the closed position. One or more controllers (not shown) may monitor states of a pipeline, such as fluid pressure upstream and/or downstream of gate valve system 10. In response to detected states (e.g., a drop or increase in pressure below or above respective predetermined threshold values), the controller may actuate stem 16 and gate assembly 20 so as to block or permit flow of fluid between upstream end 110 and downstream end 120, as desired, by introducing or removing air to the pneumatic control device. In such a configuration, valve assembly 20 be closed in response to the detection of a loss of upstream or downstream pressure, for example.

Valve seats or seat rings 90 may be secured within body 12 so as to face and abut upstream and downstream ends of gate assembly 20. Seat rings 90 may be removably secured to body 12, e.g., by threading or by press-fitting. Alternatively, seat rings 90 may be permanently secured to body 12 by welding.

With continued reference to FIG. 3, stem 16 may extend within body 12 such that the distal end of stem 16 is fixed to gate 22. A gate segment 36 of gate assembly 20 may be slidably secured to gate 22. Gate segment 36 and gate 22 may have any suitable shape. For example, segment 36 and gate 22 may be disc-shaped, wedge shaped, etc. In some configurations, gate segment 36 may be configured to slide with respect to gate 22, causing the gate assembly 20 to expand when in the closed position. A stop 38 may limit movement of gate segment 36 with respect to gate 22. When valve system 10 is closed, gate assembly 20 may expand by an amount sufficient to form a tight seal with seat rings 90 that blocks fluid communication between upstream end 110 and downstream end 120.

To prevent leaks from the top end of valve system 10, an interface between a body-facing surface of bonnet 14 and an opposite surface of body 12 may be sealed by an O-ring 100 and a gasket 102. To further prevent leaks at the top end of valve system 10, a packing assembly 32 may be provided so as to surround stem 16. With reference to FIG. 4, which is a view of section IV in FIG. 3, packing assembly 32 may include a lantern ring 24 sandwiched between packing material 26 positioned proximally and distally of lantern ring 24. Packing material 26 may be material that was introduced through packing injection fitting 28, for example. Packing assembly 32 may be configured to form a seal that prevents leaks from traveling toward the proximal end of stem 16, without introducing a significant amount of resistance to the motion of stem 16 in a vertical direction.

FIG. 5 illustrates an exemplary configuration of a service assembly, such as lubrication port 30, as viewed along line V-V of FIG. 1. Lubrication port 30 may be configured for use as a service point for inline maintenance, as described below, and may be accessible without disconnecting valve system 10 from upstream and downstream components. For example, lubrication port 30 may provide access to an interior of body 12 without disconnecting flanges 130 or removing bonnet 14. Lubrication port 30 may include a fluid fitting 40, such as a so-called giant button head injection fitting. Fluid fitting 40 may include a coupling end 42 for receiving a supply device (e.g., a grease gun) for supplying a fluid such as a grease or lubricant. Fluid fitting 40 may include an axially-extending fluid passage 44 to direct grease or lubricant supplied from coupling end 42. Fluid passage 44 may include a one-way valve (not shown) such as a ball valve, such that fluid may only pass in a direction from coupling end 42 toward gate assembly 20.

In one aspect, fluid fitting 40 may be secured by a passage member or lubrication guiding insert 50 of lubrication port 30. Lubrication guiding insert 50 may protrude from body 12 to secure fluid fitting 40 during maintenance. Lubrication guiding insert 50 may be secured permanently, if desired, via fasteners 80 and fixing members 82. A gasket 83 may be secured so as to surround a protruding portion of lubrication guiding insert 50 that extends within body 12. Lubrication guiding insert 50 may include a proximally-located inner recess 52 at an exterior end of insert 50 that receives and secures fluid fitting 40. In one aspect, side walls of inner recess 52 may include threading configured to mate with corresponding threading on the outer circumference of a delivery end of fitting 40. Alternatively, inner recess 52 may receive insert 50 by a friction fit (e.g., press fit) or any other suitable mechanism.

An end of recess 52 that faces away from body 12 may include an opening configured to receive lubricating fluid from outside of body 12. Recess 52 may transition to an axially-extending internal channel 54, as shown in FIG. 5. Internal channel 54 may extend from the proximal opening of channel 54 at the bottom of recess 52 toward an interior of body 12, such as a position that supplies lubricating fluid to gate assembly 20 within body 12. Channel 54 may define a "T" shaped fluid passage that diverts a flow of grease or lubricant into a plurality of separate radial passages 58. This "T" shape may be formed by one or more passages 58 formed within a protruding distal end of lubrication guiding insert 50. For example, passages 58 may be formed as holes formed at the interior end of insert 50 and extending to an exterior surface of insert 50. While two passages 58 are illustrated, any number of passages 58 (e.g., three, four, or more) may be provided. If desired, internal channel 54 may extend to the interior end of lubrication guiding insert 50, such that an opening formed at an end of internal channel 54 supplies lubricating fluid to one or more components of system 10, such as gate assembly 20.

In one aspect, lubricating fluid may be supplied to a location within the interior of body 12 where moving components of gate assembly 20 may be positioned (e.g., by placing valve system 10 in a closed position). For example, a surface 64 of gate assembly 20 may be positioned adjacent to radial passages 58 when valve system 10 is closed. Thus, passages 58 may be positioned to facilitate the introduction of lubricant to one or more high-wear components of gate assembly 20 when gate valve system 10 is in this closed position. In particular, lubricant may be directed onto a surface 64, which is formed at an interface between moving components of gate assembly 20, such as guide plate 62, segment 36, and/or gate 22.

Figure 6:
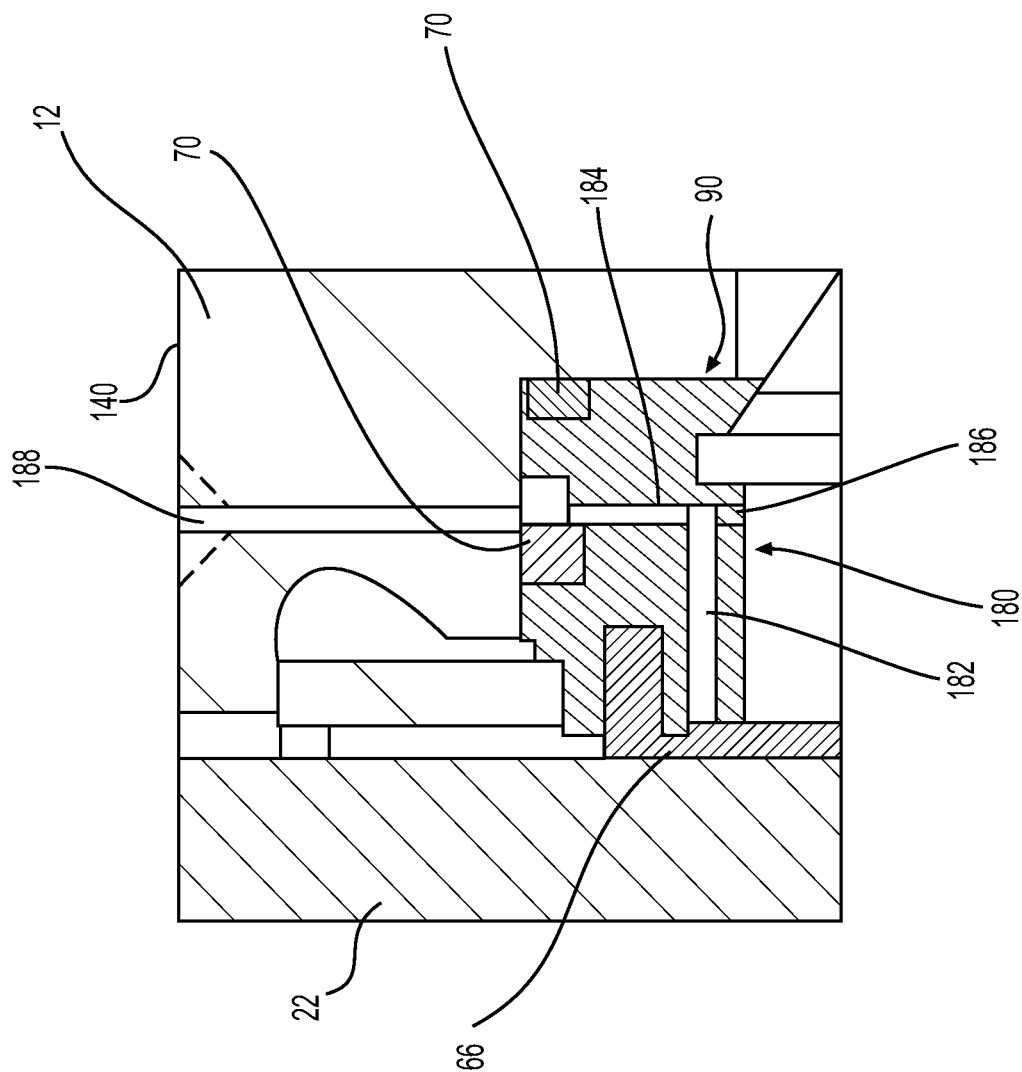
FIG. 6 is a detailed view of section VI of FIG. 3.

FIG. 6 is an enlarged view corresponding to features illustrated in section VI of FIG. 3. An upper portion of FIG. 6 may correspond to a portion of body 12 that extends to transverse end 140 or 150. Gate assembly 20 may be in the closed position such that gate 22 abuts an inward-facing surface of a ring shaped seat insert 66 placed within a main body of seat ring 90. Seat insert 66 may be formed of any suitable material (e.g., nylon, reinforced polytetrafluoroethylene, devlon, etc.) configured to form a seal with a portion of gate 22 or segment 36.

Seat ring 90 may be secured within body 12 with one or more seat seals 70 (two shown in FIG. 6). Seat seals 70 may be formed by one or more suitable sealing mechanisms, such as O-rings, ring seals, etc. One or more seat rings 90 may be configured to receive sealant supplied via one or more injection or sealant paths 180. Sealant paths 180 may be configured to receive sealant supplied from an outside of seat rings 90 and guide this sealant to a location of seat ring 90 that has failed. For example, seat ring 90 may include one or more holes, such as radial passages 184 that are in communication with an outer circumferential surface of seat ring 90.

One or more radial passages 184 formed in seat ring 90 may be in communication with one or more axial or longitudinal passages 182 that extend in a direction that is parallel to an axial direction defined by a radial center of seat ring 90. Radial passage 184 may be formed as one or more holes extending through an outer surface of seal ring 90. Radial passage 184 and/or longitudinal passage 182 may be configured to supply sealant to a point of failure, such as a leak. For example, as seat insert 66 may experience wear due to movement and force caused by contact with gate 22, seat insert 66 may fail when exposed to excessive wear, force, or both. Longitudinal passage 182 may be in fluid communication with a surface of seat insert 66 to supply sealant in the event of a leak caused by failure of seat insert 66.

While longitudinal passage 182 and radial passages 184 may be in communication with each other via a single injection port 188 extending to a transverse end 140 or 150, passages 182 and 184 may be provided as separate paths that are configured to receive sealant from a plurality of separate ports, such as a plurality of ports 188. For example, a plurality of ports 188 may be provided in body 12 to provide paths to each seal 70 and insert 66.

As injection port 188 may extend to an outer surface of body 12, such as a surface of transverse end 140 and/or 150, injection port 188 may be accessible when valve system 10 is in the closed position, without the need to remove bonnet 14 and without disconnecting flanges 130 from upstream and downstream components. While injection port 188 is illustrated as having a straight path in FIG. 6, injection port 188 may include one or more turns that facilitate access to an opening of port 188 and the supply of sealant to a desired location of seat ring 90. As represented by the dashed lines in FIG. 6, port 188 may include a widening or tapering opening. If desired, an end of port 188 configured to receive sealant may include any suitable fitting to facilitate the introduction of sealant. In the event of failure of a seal 70 resulting in a leak, sealant may be supplied from port 188 to a failed seal 70.

In some embodiments, sealant path 180 may be configured to receive sealant from an inner circumferential surface of seat ring 90, which may include, for example, an introduction port 186. In some aspects, introduction port 186 may include a removable and/or frangible seal or insert that, when removed or punctured, facilitates the injection of sealant. Introduction port 186 may be useful, for example, when fluid is not supplied to valve system 10. When ports 186 and 188 are both present, these ports may be aligned with each other or, if desired, at least partially offset from each other.

With reference to FIG. 5, an exemplary process for inline maintenance (e.g., maintenance performed without disconnecting flanges 130 from upstream and downstream components of a pipeline), may include positioning fluid fitting 40 within recess 52 of lubrication guiding insert 50. With fluid fitting 40 so positioned, a fluid or lubricant supply device may be fixed to fluid fitting 40. For example, a grease or lubrication introduction device, such as a grease gun, may be secured to a proximal end of a fluid passage 44 located on coupling end 42 of fluid fitting 40. Grease or other lubricant may be injected via fluid passage 44 such that lubricant flows through fluid passage 44 and enters an opening at an end of recess 52 at an opposite end of fitting 40. The lubricant may travel through channel 54 to exit lubrication guiding insert 50, either via an opening formed by channel 54, or through one or more passages 58. The grease or other lubricant may then enter high-wear areas of gate valve system 10, such as gate assembly 20. In particular, lubricant may be supplied to surface 64 to reduce friction experienced by moving parts of gate assembly 20. This process may be performed, in its entirety, while fluid is present within upstream end 110, for example, while gate assembly 20 is in a closed position resisting a flow of fluid from upstream end 110.

With reference to FIG. 6, an exemplary process for sealing a leak in gate valve system 10 may include supplying sealant to an injection port 188 extending, for example, through transverse end 140 and/or 150. The sealant may travel through port 188 to one or more radial passages 184 extending through a radially-outer surface of seat ring 90. Radial passages 184 may supply sealant to a seal 70, such as an O-ring. A longitudinal passage 182 extending from radial passage 184 may supply sealant to seat insert 66. If desired, injection port 188 may include a path in body that supplies sealant directly to seat insert 66. Additionally or alternatively, an injection port 186 may be provided on an interior of seat ring 90 to supply sealant to longitudinal passage 182.

It will be apparent to those skilled in the art that modifications may be made in the disclosed systems and methods without departing from the scope of the disclosure. Other aspects of the disclosure will be apparent to those skilled in the art from consideration of the specification and practice of the features disclosed herein. It is intended that the specification and embodiments be considered as exemplary only.

What is claimed is:

1. A method of assembling a gate valve system, the method comprising:
   forming a body including an upstream end, a downstream end, and a flow path extending through the upstream end and the downstream end;
   placing an expandable gate valve assembly within the body, the expandable gate valve assembly including a gate within the body and a stem secured to the gate, the stem being configured to actuate the gate between a first position in which a flow of fluid is permitted between the upstream end and the downstream end and a second position in which the flow of fluid is prevented;
   forming a lubrication port in an exterior of the body, the lubrication port being in fluid communication with an interior of the body and including a lubrication guiding insert configured to guide a supply of fluid to a location between the upstream end and the downstream end, the lubrication guiding insert including:
   an axially-extending channel with a first end positioned outside of the body and a second end positioned inside the body;
   a proximal opening at the first end, the proximal opening being configured to receive a fluid fitting; and
   a distal opening opposite the proximal opening;
   positioning a seat ring to contact the gate when the gate is in the second position, the seat ring including a radially-extending passage, an outermost radial surface of the seat ring being fluidly connected to a ring-shaped seat insert via the radially-extending passage and an axially-extending passage of the seat ring; and
   forming a sealant port extending within the body, the sealant port being in fluid communication with the radially-extending passage in the seat ring.

2. The method of claim 1, wherein the lubrication guiding insert includes a proximal recess and the proximal opening that receives the fluid fitting.

3. The method of claim 1, wherein the sealing port extends to the exterior of the body.

4. A gate valve system, comprising:
   a body including:
   an upstream end;
   a downstream end; and
   a flow path extending through the upstream end and the downstream end;
   a gate assembly extending within the body, the gate assembly including:
   an expandable gate; and
   a stem secured to expandable the gate and configured to place the expandable gate in a first position in which a flow of fluid is permitted between the upstream end and the downstream end and a second position in which the flow of fluid is prevented;

a lubrication port in an exterior of the body, the lubrication port being in fluid communication with an interior of the body;

a lubrication guiding insert secured within the lubrication port, the lubrication guiding insert including:

an axially-extending channel with a first end positioned outside of the body and a second end positioned inside the body;

a proximal opening at the first end, the proximal opening being configured to receive a fluid fitting;

a distal opening opposite the proximal opening;

a seat ring positioned to contact the expandable gate when the expandable gate is in the second position, the seat ring including a radially-extending passage, an outermost radial surface of the seat ring being fluidly connected to a ring-shaped seat insert via the radially-extending passage and an axially-extending passage of the seat ring; and a sealant port extending within the body, the sealant port being in fluid communication with the radially-extending passage in the seat ring, wherein the lubrication guiding insert is configured to guide a supply of lubricating fluid to a location inside the body and between the upstream end and the downstream end.

5. The gate valve system of claim 4, wherein the lubrication guiding insert includes a proximal recess formed at the proximal opening to receive the fluid fitting.

6. The gate valve system of claim 4, wherein the distal opening of the lubrication guiding insert is a radially-positioned opening.

7. The gate valve system of claim 4, wherein the distal opening of the lubrication guiding insert is positioned to supply fluid to a surface of the gate assembly.

8. The gate valve system of claim 4, wherein the distal opening of the lubrication guiding insert is positioned to supply fluid to a guide plate connected to the gate assembly.

9. The gate valve system of claim 4, wherein the sealant port extends to an outer surface of the body.

10. The gate valve system of claim 4, wherein the axially-extending passage of the seat ring is a longitudinal passage that extends in a direction that is parallel to an axial direction defined by the seat ring.

11. The gate valve system of claim 10, wherein the longitudinal passage extends from the radially-extending passage.

12. The gate valve system of claim 11, wherein the longitudinal passage extends to the seat insert.

13. The gate valve system of claim 4, wherein the radially-extending passage extends through the outermost radial surface of the seat ring within the body.

14. The gate valve system of claim 4, wherein the lubrication guiding insert includes a proximal recess formed with internal threads configured to mate with the fluid fitting.

15. The gate valve system of claim 14, wherein the first end of the axially-extending channel extends from the proximal recess towards the distal opening.

* * * * *